United States Patent [19]

Sato et al.

[11] 4,213,414
[45] Jul. 22, 1980

[54] ENGINE EXHAUST MEANS FOR MOTOR PROPELLED BOATS

[75] Inventors: Masato Sato, Akashi; Takemi Inoue, Kakogawa, both of Japan

[73] Assignee: Kawasaki Jukogyo Kabushiki Kaisha, Kobe, Japan

[21] Appl. No.: 866,910

[22] Filed: Jan. 4, 1978

[30] Foreign Application Priority Data

Jan. 13, 1977 [JP] Japan .............................. 52-3602[U]

[51] Int. Cl.² .............................................. F01N 1/00
[52] U.S. Cl. ........................................ 115/73; 115/70; 115/72; 181/249; 181/255; 181/282
[58] Field of Search ....................... 115/73, 75, 70, 72; 181/249, 251, 264, 269, 272, 282, 255

[56] References Cited

U.S. PATENT DOCUMENTS

| | | | |
|---|---|---|---|
| 963,822 | 7/1910 | Smith | 181/269 |
| 2,059,220 | 11/1936 | Fernstrum | 115/72 |
| 2,416,452 | 2/1947 | Marx | 181/272 |
| 3,317,001 | 5/1967 | Powers et al. | 181/255 |
| 3,369,518 | 2/1968 | Jacobson | 115/70 |

*Primary Examiner*—Sherman D. Basinger
*Attorney, Agent, or Firm*—Dennis P. Clarke

[57] ABSTRACT

Engine noise attenuator for motor-propelled boats including a housing made of resilient material and having one end connected to the exhaust pipe and a perforated pipe disposed within the housing and supported by the housing wherein the perforated pipe is in communication with the exhaust pipe such that the perforations form a resonance chamber between the housing and the exhaust pipe.

1 Claim, 4 Drawing Figures

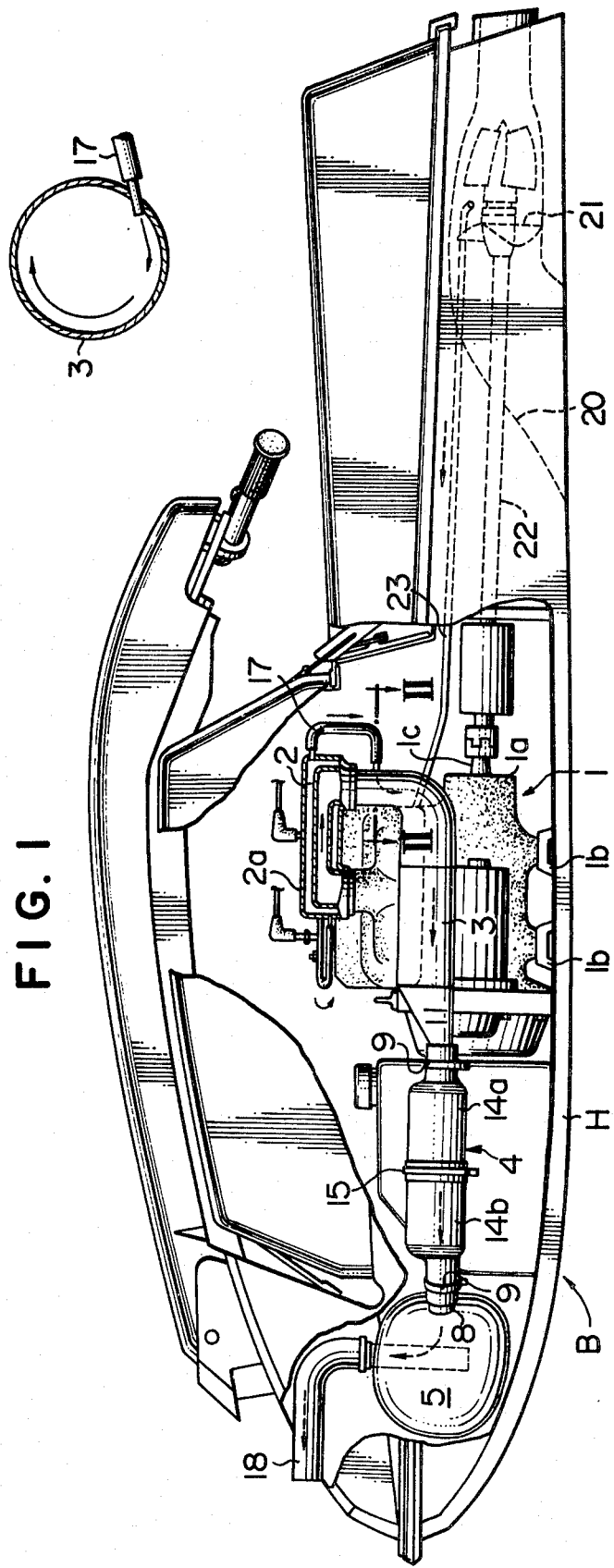

ENGINE EXHAUST MEANS FOR MOTOR PROPELLED BOATS

The present invention relates to motor-propelled boats and more particularly to engine exhaust means for such boats. More specifically, the present invention pertains to vibration absorbing arrangements in engine exhaust means for motor-propelled boats.

Conventionally, it has been a common practice in motor-propelled boats to mount engines on boat hulls through resilient mounting means so that engine vibrations are absorbed by the mounting means before they are transmitted to the boat hulls. However, since the engine exhaust systems are rigid with respect both to the engines and to the boat hulls, the engine vibrations are transmitted through the exhaust systems to the boat hulls causing uncomfortable vibrations of boat hulls and simultaneously applying substantial vibration loads to parts in the exhaust systems.

It is therefore an object of the present invention to provide engine exhaust means for motor-propelled boats wherein means is provided for isolating transmittal of engine vibration to the boat hull.

Another object of the present invention is to provide vibration absorbing arrangements for engine exhaust means in motor-propelled boats.

Still further object of the present invention is to provide means for preventing vibration loads from being transmitted to parts in the engine exhaust system.

A further object of the present invention is to provide engine noise attenuating means which possesses abilities for absorbing engine vibration.

According to the present invention, the above and other objects can be accomplished by a motor-propelled boat comprising a boat hull, internal combustion engine means mounted on said boat hull through resilient mounting means and adapted to drive propulsion means, said engine means including body means and exhaust means connected with said body means, said exhaust means including exhaust pipe means rigidly connected with the engine body means and noise attenuating means which includes housing means made of resilient material and having one end connected to the exhaust pipe means and perforated pipe means disposed in said housing means and being supported by the housing means, said perforated pipe means being in communication with said exhaust pipe means and having perforations so that resonance chamber means is formed between the housing means and the exhaust pipe means.

The noise attenuating means may further include second housing means which may be of rigid material and connected at one end with the first housing means and at the other end with outlet pipe means. The perforated pipe means may extend through the first and second housing means. If necessary, partition wall means may be provided at the junction between the first and second housing means so that the second housing means is firmly supported by the perforated pipe means.

The above and other objects and features of the present invention will become apparent from the following descriptions of preferred embodiments taking reference to the accompanying drawings, in which:

FIG. 1 is a partially cut-away side view of a boat embodying the features of the present invention;

FIG. 2 is a sectional view taken along the line II—II in FIG. 1;

Figure 3:
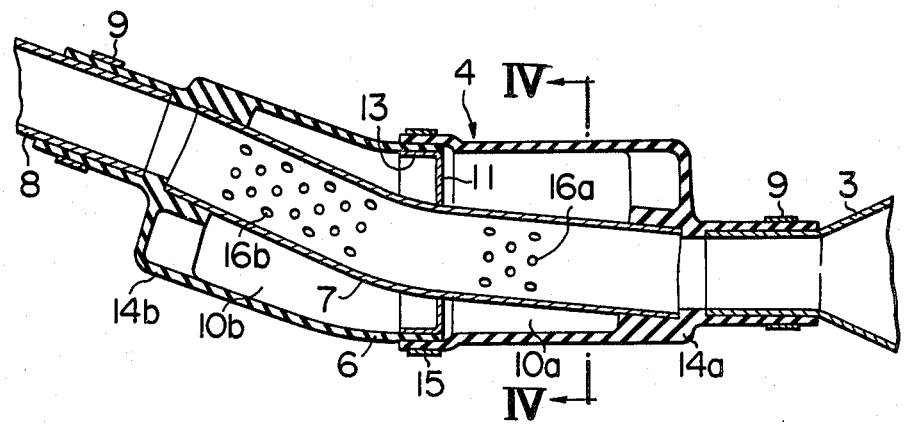
FIG. 3 is a longitudinal sectional view of the silencer embodying the feature of the present invention.

Referring to the drawings, particularly to FIG. 1, there is shown a water-jet boat B having a boat hull H. In the boat hull H, there is mounted an internal combustion engine 1 having a body 1a. As conventional in the art, the engine body 1a is mounted on the hull H through resilient engine mounts 1b so that the engine vibration is absorbed before it is transmitted to the boat hull H. The boat hull H is formed at the rear portion thereof with a water passage 20 which opens at the front end to the bottom of the hull H and at the rear end to the stern. In the water passage 20, there is disposed a water jet propulsion unit 21 which is drivingly connected through a shaft 22 with the output shaft 1c of the engine 1.

The engine 1 has an exhaust pipe 2 which is surrounded by a water jacket 2a so that the pipe 2 is cooled by cooling water circulating in the jacket 2a. The water jacket 2a is connected with water jackets (not shown) provided in the engine body 1a for cooling the engine cylinders. A cooling water pipe 23 is provided for drawing water from the water passage 20 to the water jacket in the engine body 1a whereby the cooling water is circulated through this water jacket to the water jacket 2a on the exhaust pipe 2.

The exhaust pipe 2 is connected with an expansion chamber 3 which is in turn connected with a silencer assembly 4. The silencer 4 has an outlet pipe 8 which is opened to a discharge chamber 5 having a discharge pipe 18 as taught by Japanese utility model publication Sho 52-18551 published on Apr. 26, 1977. The water jacket 2a is connected through a pipe 17 with the expansion chamber 3 so that the cooling water in the jacket 2a is discharged tangentially into the expansion chamber 3 to be exhausted with the combustion gas.

Figure 4:
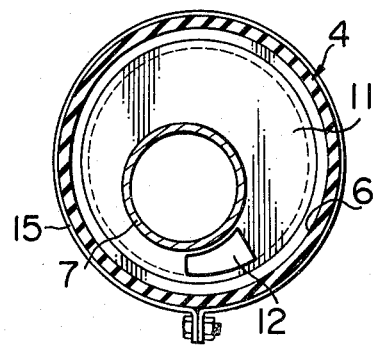
FIG. 4 is a cross-sectional view of the silencer taken along the line IV—IV in FIG. 3.

Referring further to FIGS. 3 and 4 which show in detail the structure of the silencer 4, the silencer includes a first housing 14a which is made of a resilient material such as rubber and connected at one end by means of a clamp 9 with the outlet end of the expansion chamber 3. The silencer 4 has a second housing 14b which is connected with the other end of the first housing 14a by means of a clamp 15. The second housing 14b may be made of a rigid material such as steel and has the other end connected with the outlet pipe 8 by means of a clamp 9. Within the housings 14a and 14b, there is disposed a perforated pipe 7 which extends throughout the lengths of the housings 14a and 14b. The pipe 7 is in communication with the expansion chamber 3 and the outlet pipe 8 so that the exhaust gas flows from the expansion chamber 3 through the perforated pipe 7 to the outlet pipe 8.

At the junction between the first and second housings 14a and 14b, there is provided a partition wall 11 which extends radially between the perforated pipe 7 and the second housing 14b. The partition wall 11 is formed at its outer periphery with a cylindrical flange 13 which is adapted to engage with the inner surface of the second housing 14b. Thus the first and second housings 14a and 14b are firmly supported on the pipe 7 through the partition wall 11 when the clamp 15 is tightened. Further, the partition wall 11 serves to divide the inside of the housings into two chambers 10a and 10b. The pipe 7 is formed with perforations 16a and 16b which open respectively to the chambers 10a and 10b. Thus, resonance type noise attenuating means is provided by these chambers 10a and 10b. If necessary, the chambers 10a and 10b may be connected together by an opening 12 formed in the partition wall 11.

In the arrangement as described, the first housing 14a is made of a resilient material such as rubber so that it is possible to isolate transmittal of engine vibration from the expansion chamber 3 to the outlet pipe 8. It is of course within the scope of the present invention to constitute both of the housings 14a and 14b by resilient material. Further, the housings 14a and 14b may be formed as an integral piece by a resilient material.

The invention has thus been shown and described with reference to a specific embodiment, however, it should be noted that the invention is in no way limited to the details of the illustrated structures but changes and modifications may be made without departing from the scope of the appended claims.

We claim:

1. Motor-propelled boat comprising a boat hull, internal combustion engine means mounted on said boat hull through resilient mounting means and adapted to drive propulsion means, said engine means including body means and exhaust means connected with said body means, said exhaust means including exhaust pipe means rigidly connected at one end with the engine body means and at the other end with an expansion chamber means, noise attenuating means which includes a housing means having one end connected to the expansion chamber means and perforated pipe means disposed in said housing means and being supported by the housing means, said perforated pipe means being in communication with said expansion chamber means and having perforations so that resonance chamber means is formed between the housing means and the pipe means, said noise attenuating housing means including a first and second housing means, said first housing means being constructed entirely of resilient rubber material and connected at one end with said expansion chamber means such that engine vibrations transmitted through the exhaust pipe means are absorbed thereby and at the other end with said second housing means, the other end of said second housing means being connected with outlet pipe means, said noise attenuating means further including partition wall means located at a position where the first and second housing means are connected together, said partition wall means extending radially between the housing means and the perforated pipe means to define a plurality of resonance chamber means.

* * * * *